No. 670,895. Patented Mar. 26, 1901.
F. C. ESMOND.
UNIT MULTIPLE SYSTEM OF ELECTRICAL TRAIN CONTROL.
(Application filed Aug. 2, 1898.)
(No Model.)
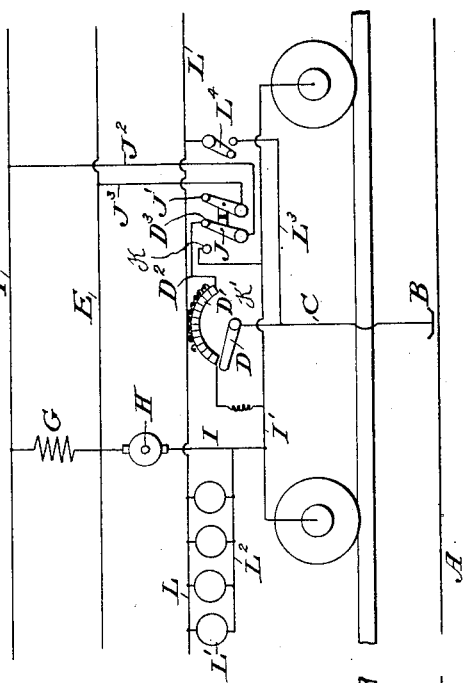
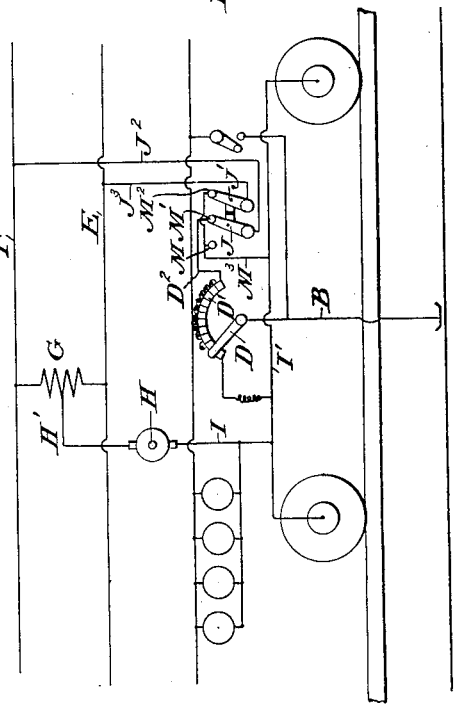
Witnesses:
John H. Mulchahey
Gouverneur Kemble
Inventor:
Frederick C. Esmond
by Clarkson A. Collins
Atty.

UNITED STATES PATENT OFFICE.

FREDERICK C. ESMOND, OF BROOKLYN, NEW YORK, ASSIGNOR TO THE ESMOND ELECTRIC TRACTION AND SIGNAL COMPANY, OF WEST VIRGINIA.

UNIT-MULTIPLE SYSTEM OF ELECTRICAL TRAIN CONTROL.

SPECIFICATION forming part of Letters Patent No. 670,895, dated March 26, 1901.

Application filed August 2, 1898. Serial No. 687,506. (No model.)

*To all whom it may concern:*

Be it known that I, FREDERICK C. ESMOND, a citizen of the United States, residing at Brooklyn, in the county of Kings and State of New York, have invented certain new and useful Improvements in Unit-Multiple Systems of Electrical Train Control, of which the following is a specification.

My invention relates to a unit-multiple system for electric railways—that is, a system in which a train of cars may be controlled from any car to run the train in either direction.

I will describe a system for electric railways involving my invention and then point out the novel features in the claims.

In the drawings, Figure 1 a diagrammatic view of the wiring in a car. Fig. 2 is also a diagrammatic view, but showing a different method of wiring a car.

Similar letters of reference refer to corresponding parts in both figures.

A represents a supply-conductor, B a trolley or other device adapted to receive current from the conductor A, and C a conductor from the device B to the arm D of a controller D'. E F represent two conductors which extend, preferably, through the car. These conductors are connected with the controller, as hereinafter described, and with the elements (field and armature) of the motor. One of the elements—in this instance the field G—is in parallel with the conductors E F, so that the current may be sent through it in either direction, thus enabling the armature H to be rotated in either direction.

I represents a conductor leading from the armature to a conductor I', extending between both axles of the car to form a return or ground for the armature.

J J' represent a two-arm switch, through which the current passes from the controller D' to the conductors E F. A conductor $D^2$ leads from the last notch of the controller to a contact-point $D^3$, with which either arm J or J' may engage. Should the arm J be on the point $D^3$, the current will pass through the arm J from the controller, through conductor $J^2$ to conductor F, then through the field G and armature H to ground. In this instance the field and armature would be in series and would cause the armature to rotate to drive the car in one direction. Should, however, the arm J' be on the contact $D^3$, the current will pass through conductor $J^3$ to conductor E, through the armature H to ground through I and I', and through the field G in a direction opposite to that in the last instance, making its return from the field through conductors F and $J^2$ to arm J and through contact-point K, to which the arm J has been moved, through conductor K' to conductor I', to ground. With the current passing through the field in the direction just stated the armature will be caused to rotate in a reverse direction and drive the car in the opposite direction. As all of the cars in the train are wired, as just described, it will be seen that when they are coupled and the conductors E F coupled the motors of the whole train can be controlled from one car and the direction of the train changed by simply changing the switch J J' in one car. When the switch is in one position, the current passes through the field and armature in series and ground in each car; but when the direction of the current is changed through the fields the ground or return for all the fields will be made through the controlling-car; but the ground for the current through the armature will be on each car—that is to say, the fields and armatures of the train-motors are in multiple relation with one another in one direction of travel and in series-multiple relation with one another in the opposite direction of travel.

L represents a conductor extending through the car, to which the lights L' are connected. The return for the lights is made through conductor $L^2$, which connects with conductor I. Current is supplied to the conductor L directly through the trolley or device B, conductor C, and conductor $L^3$, in which is interposed a switch $L^4$. This manner of wiring for the lights is the same in all the cars, and when the cars are coupled to form a train the conductors L of the several cars are coupled, so that the lights throughout the whole train may be supplied and controlled from any car of the train.

In Fig. 2 I have shown a different manner of wiring a car. In this method the armature is tapped into the field and receives its current from the field through the conductor H', so that in either direction of travel of the car a part of the field will be in series and a part in parallel with the armature. This is accomplished by having three contact-points M M' M² in connection with the switch-arms J J', two of which contact-points are connected with the return or ground I' through conductor M³. The current passes from the controller D' through conductor D² always to contact-point M'. Should the arm J be on this point, the current will pass through conductor J² to conductor F to the field G. A part of the current will pass through the conductor H' to armature H and thence to ground. The remaining part will pass through the rest of the field to conductors E and J³ to arm J', through contact-point M² to conductor M³ to ground I'. This will cause the armature to rotate and drive the car in one direction. When arm J' is on contact-point M', the current will then pass through conductors J³ and E to the field G, part of it passing through the conductor H' to armature H to ground through conductor I. The remaining current will pass through the rest of the field and ground through conductors F and J² to arm J, through contact-point M, conductor M³ to ground I'. As the current in this last instance was started through the field in the opposite direction the armature will rotate in the reverse direction, and thus drive the car in a direction contrary to that above mentioned. When cars wired as shown in Fig. 2 are coupled and the conductors E and F of each car coupled, all the motors can be operated from a single car. The return of the current passing through all the fields will be made in the controlling-car, and the return from each armature will be made in its respective car.

I do not claim herein the system of lighting railway-cars shown in the drawings, but have made the same the subject of an application which is a division hereof, filed June 2, 1900, Serial No. 18,880.

While I have described and illustrated my invention in connection with the operation of railway-trains, to which it is particularly adapted, it will be evident that it is usefully applicable to the operation of a set or series of motors or groups of motors not located on railway-cars, which it may be desired to synchronously control from any one of separated points, and I wish it understood that the claims are intended to apply to and cover the system of motor control however the motors may be located.

What I claim as new is—

1. The combination of a pair of conductors extending through a train of cars, motors carried by individual cars of such train each motor having one of its elements connected between said conductors, a supply-conductor, a controller on each motor-carrying car electrically connected with said supply-conductor, electrical connections between said controllers and said pair of conductors, and a reversing-switch in each of said last-mentioned connections, substantially as described.

2. In a unit-multiple system of electrical train control, the combination of a pair of conductors extending through the train, motors carried by individual cars of the train each motor having one of its elements connected between said conductors and its other element connected between one of said conductors and a ground or other return conductor, a supply-conductor, motor-controllers on individual cars of the train electrically connected with said supply-conductor, and electrical connections between said controllers and said pair of conductors, substantially as described.

3. In a unit-multiple system of electrical train control, the combination of a pair of conductors extending through the train, motors carried by individual cars of the train each motor having one of its elements connected between said conductors and its other element connected between one of said conductors and a ground or other return conductor, a supply-conductor, electrical connections on individual cars of the train between said supply-conductor and said pair of conductors and a reversing-switch in each of said connections, substantially as described.

4. In a unit-multiple system of electrical train control, the combination of a pair of conductors extending through the train, motors carried by individual cars of the train each motor having one of its elements connected between said conductors and its other element between one of said conductors and a ground or other return conductor, a supply-conductor, electrical connections on individual cars of the train between said supply-conductor and said pair of conductors and a motor-controller and a reversing-switch in each of said last-mentioned connections, substantially as described.

5. The combination of a pair of conductors extending through a car, a motor carried by said car and having one of its elements between said conductors, and its other element connected with said first element and with a ground or return, an electric supply to said car, a controller in said electric supply and having an electrical connection with a contact-point, and a two-arm switch each arm of which has electrical connection with said conductors and adapted to contact with said contact-point, whereby by changing the arms on said contact-point the current can be made to pass in either direction through said element between said conductors, substantially as described.

6. A unit-multiple system of electrical train control comprising conductors extending through the train, a multiplicity of motors connected therewith, said motors being so arranged that in one direction of travel the elements of each motor will be in multiple with each other and in the opposite direction of travel in series with each other, and devices for controlling the supply of current to said motors whereby they may be caused to rotate in either direction, substantially as described.

7. A unit-multiple system of electrical train control comprising a pair of conductors extending through the train and motors on individual cars of the train, one of the elements of each of which is connected between said conductors and the other element of each of which is connected to said first-mentioned element between the terminals thereof and to a ground or other return conductor, substantially as described.

8. A unit-multiple system of electrical train control comprising a pair of conductors extending through the train, motors on individual cars of the train one of the elements of each of which is connected between said conductors and the other element of each of which is connected to the first-mentioned element between the terminals thereof and to a ground or other return conductor, and means on individual cars for reversing the flow of current through said first-mentioned elements, substantially as described.

9. In a unit-multiple system of electrical train control the combination of a series of cars which form a train, a pair of conductors adapted to be connected throughout the train, a motor having one of its elements connected between said conductors and its other element connected to the first-mentioned element between the terminals thereof and to a ground or other return conductor, controllers on individual cars of the train having electrical connections with a supply-conductor and with said pair of conductors, and a reversing-switch located in each of said connections, substantially as described.

10. In a unit-multiple system of electrical train control, the combination of conductors adapted to be connected throughout the train, means for supplying current to said conductors, and motors carried on individual cars of the train and connected to said conductors and so arranged that corresponding elements of the several motors are in parallel with one another, and the elements of each individual motor are in series with each other in one direction of travel and in parallel with each other in the opposite direction of travel, substantially as described.

11. In a unit-multiple system of electrical train control, the combination of conductors adapted to be connected throughout the train, means for supplying current to said conductors and motors carried on individual cars of the train and adapted to have the elements of each individual motor connected to said conductors in parallel with each other, substantially as described.

12. In a unit-multiple system of electrical train control, the combination of conductors adapted to be connected throughout the train, means for supplying current to said conductors, motors carried on individual cars of the train and adapted to have the elements of each individual motor connected to said conductors in parallel with each other, and motor-controllers carried by individual cars of the train each of which is adapted to control all the motors of the train, substantially as described.

13. In a unit-multiple system of electrical train control, the combination of conductors adapted to be connected throughout the train, means for supplying current to said conductors, motors carried on individual cars of the train and adapted to have the elements of each individual motor connected to said conductors in parallel with each other, and means operable on individual cars of the train for reversing the direction of rotation of all said motors, substantially as described.

14. In a unit-multiple system of electrical train control, the combination of conductors adapted to be connected throughout the train, means for supplying current to said conductors, motors carried on individual cars of the train and adapted to have the elements of each individual motor connected in parallel with each other, and means operable on individual cars of the train for regulating the flow of current through all said motors and for reversing the direction of rotation thereof, substantially as described.

In testimony whereof I have signed my name to this specification in the presence of two subscribing witnesses.

FREDERICK C. ESMOND.

Witnesses:
 GEO. E. CRUSE,
 H. COUTANT.